UNITED STATES PATENT OFFICE.

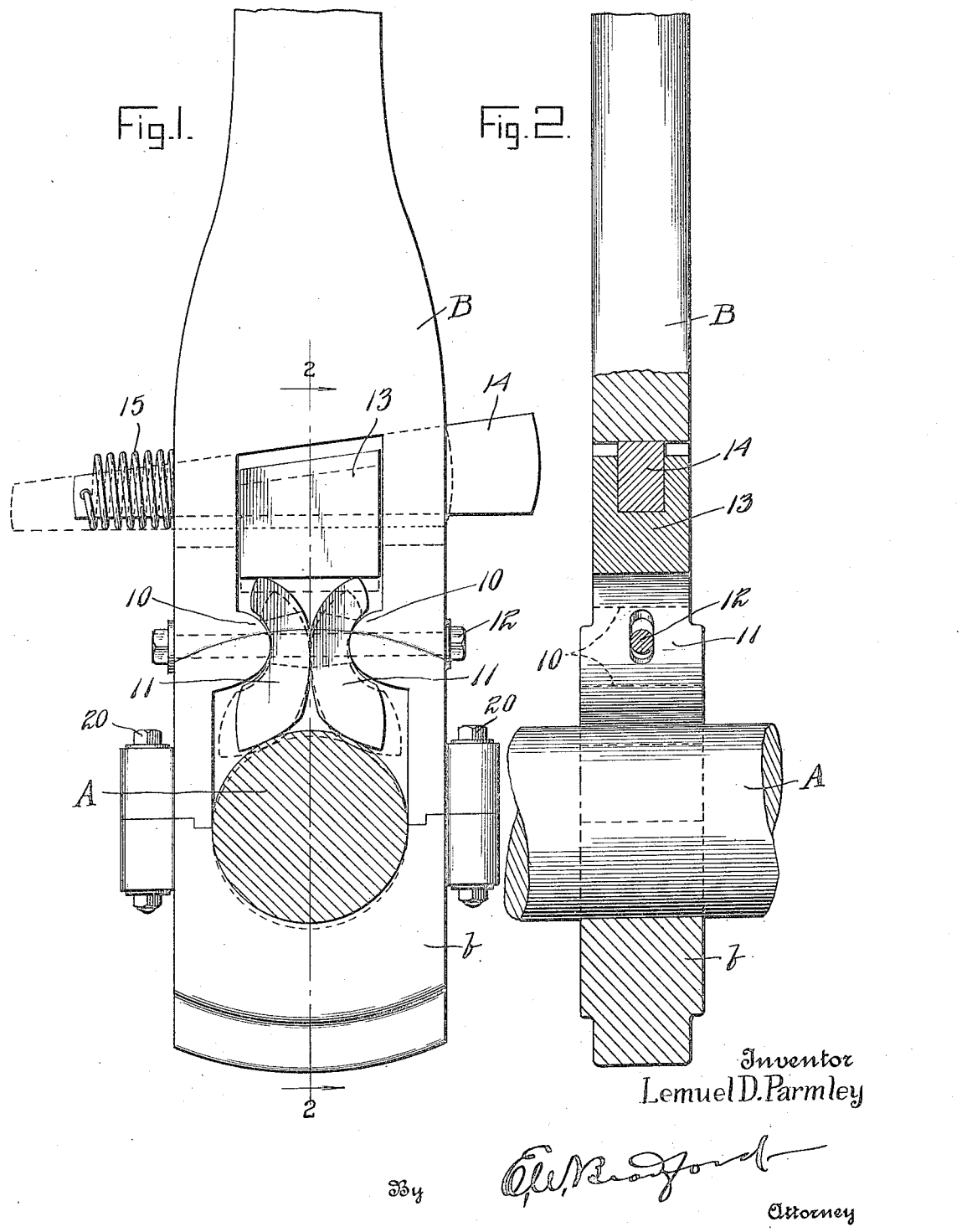

LEMUEL D. PARMLEY, OF WAYNESBORO, PENNSYLVANIA.

ADJUSTABLE BEARING FOR CONNECTING RODS.

1,403,346.  Specification of Letters Patent.  Patented Jan. 10, 1922.

Application filed July 28, 1920. Serial No. 399,594.

*To all whom it may concern:*

Be it known that I, LEMUEL D. PARMLEY, a citizen of the United States, residing at Waynesboro, in the county of Franklin and State of Pennsylvania, have invented certain new and useful Improvements in Adjustable Bearings for Connecting Rods, of which the following is a specification.

My said invention consists in certain improvements in the details of construction and arrangement of parts of compensating bearings, which while designed particularly for the connection between a connecting rod and crank-shaft, yet is adapted for use in any other place where such bearings may be found of advantage, whereby such a bearing is provided which will automatically adjust itself to any wear and in a manner to guard against any binding or cramping in the bearing as the wear progresses, all as will be hereinafter more fully described and claimed.

Referring to the accompanying drawings, which are made a part hereof and on which similar reference characters indicate similar parts, Figure 1 is a side elevation of the end of a connecting rod constructed in accordance with my said invention, showing the crank pin of a crank shaft in the position it normally occupies therein while in use, and Figure 2 a sectional view through the same as seen when looking in the direction indicated by the arrows from the dotted line 2—2 in Figure 1.

In said drawings the portions marked A represent the shaft or crank, and B the connecting rod.

The crank-shaft A may be of any usual or appropriate construction.

The connecting-rod B likewise, in the main, is of any appropriate construction, the lower end $b$ being secured in place by bolts 20 or it may be formed in piece with the upper end of the rod or may be of any other construction formed appropriate.

The bearing for shaft A is formed in a recess in the outer end of said rod, the outer end of said recess being semi-circular to conform with the shaft and the sides of said recess being straight and parellel with the sides of the rod and having segmental lugs 10 appropriately located. Bearing blocks 11 are mounted between said lugs 10 being supported on a bolt 12 which extends through a slot therein and through a transverse perforation in the rod at this point. Each of said bearing blocks is formed concave on its outside to engage and rock upon one of the segmental lugs 10. The adjacent faces are convex and adapted to bear against and rock upon each other and their lower ends are adapted to bear against the adjacent surface of the shaft A, serving as the other side of the bearing for said shaft. Said lower ends are likewise formed somewhat convex so that in wearing away they will always provide for a freedom of movement for shaft A and avoid any cramping or binding between said shaft and its bearing, notwithstanding the wear.

In the recess above segmental lugs 10 is mounted a block 13 having a transverse recess. A wedge shaped member 14 is mounted in said recess and adapted to bear between the tapered upper edge of the recess in rod B and the lower edge of the recess in block 13, being actuated by a spring 15 interposed between a connection with the outer end of the said member 14 and the side of rod B. Said spring 15 serves to hold block 13 under tension against the upper ends of bearing blocks 11 and thus hold said bearing blocks constantly against the surface of shaft A. The connection between pin 12 and said bearing blocks 11 provides for the movement of said blocks, as is most clearly illustrated in Figure 2.

By this means the bearing between the shaft A and rod B is automatically kept in close contact at all times. The wear being automatically taken up and all rattle and other disadvantages of loose bearings thus prevented.

Having thus fully described my said invention, what I claim as new and desire to secure by Letters Patent, is:

1. In automatic adjustable bearings, the combination of a shaft, a connecting rod, a bearing in said connecting rod for said shaft consisting in part of rockingly mounted blocks adapted to bear on one side of the shaft, and means for holding said blocks under yielding pressure, substantially as set forth.

2. An adjustable bearing comprising a box one side of which is composed of bearings blocks mounted for rocking adjustment and formed with surfaces to bear upon the shaft, a sliding block bearing against a part of each block remote from the shaft and means for imparting constant pressure, substantially as set forth.

3. In a device of the character described, the combination of a shaft, a connecting rod formed with a bearing opening and segmental lugs formed on the sides of said opening, segmental blocks mounted on said lugs, a transverse support for holding said segmental blocks loosely on said segmental lugs, a sliding member above said segmental blocks and bearing thereon, and means for holding said sliding member under pressure, substantially as set forth.

4. An adjustable bearing for a shaft comprising, a pair of blocks having convex surfaces adapted to bear against one side of the shaft and also against each other, said blocks being supported for independent rocking adjustment, and means for moving the blocks toward the shaft, substantially as set forth.

5. In combination, a shaft and a bearing therefor comprising, stationary rounded abutments, a pair of segmental blocks having their concave sides resting against said abutments and said blocks bearing against each other at their convex sides, guiding means for said blocks, and means to move them yieldably and independently toward the shaft, substantially as set forth.

6. In combination, a shaft and a bearing therefor comprising, a pair of blocks having convex faces in engagement with each other, said faces also engaging the shaft at one end, means for supporting said blocks for independent movement toward the shaft, and yieldable means for moving them toward the shaft, substantially as set forth.

7. In combination a shaft and a bearing therefor comprising a pair of bearing blocks having concave and convex faces, rounded lugs on the bearing engaging said concave faces and forming rocking supports for the blocks, guiding means passing through said lugs and blocks, and means to move the bearing blocks toward the shaft, substantially as set forth.

In witness whereof, I have hereunto set my hand and seal at Waynesboro, Pennsylvania, this 26th day of July, A. D. nineteen hundred and twenty.

LEMUEL D. PARMLEY. [L. S.]

Witnesses:
GERTRUDE E. ADAMS,
JOHN A. POTTER.